(12) United States Patent
Kotter

(10) Patent No.: US 12,017,339 B1
(45) Date of Patent: Jun. 25, 2024

(54) TOOL ORGANIZER

(71) Applicant: Kenneth Coburn Kotter, Mandeville, LA (US)

(72) Inventor: Kenneth Coburn Kotter, Mandeville, LA (US)

( * ) Notice: Subject to any disclaimer, the term of this patent is extended or adjusted under 35 U.S.C. 154(b) by 280 days.

(21) Appl. No.: 17/368,217

(22) Filed: Jul. 6, 2021

Related U.S. Application Data

(60) Provisional application No. 63/048,904, filed on Jul. 7, 2020.

(51) Int. Cl.
*B25H 3/06* (2006.01)
*E04G 5/00* (2006.01)

(52) U.S. Cl.
CPC ............... *B25H 3/06* (2013.01); *E04G 5/003* (2013.01)

(58) Field of Classification Search
CPC ............. E04G 5/003; B25H 3/06; B25H 3/04
See application file for complete search history.

(56) References Cited

U.S. PATENT DOCUMENTS

| | | | | |
|---|---|---|---|---|
| 1,697,711 A * | 1/1929 | Brown | ..................... | A47J 47/16 211/88.01 |
| 5,158,023 A * | 10/1992 | Allen | ..................... | E04G 5/00 182/120 |
| 5,217,193 A * | 6/1993 | Drucker | .................. | E04D 15/00 248/154 |
| 5,370,263 A * | 12/1994 | Brown | ..................... | E06C 7/14 220/756 |
| 5,622,463 A * | 4/1997 | Testa | ..................... | B23D 61/003 409/137 |
| 5,641,142 A * | 6/1997 | Hanson | .................... | E06C 7/14 248/210 |
| 5,913,380 A * | 6/1999 | Gugel | ..................... | E06C 7/182 248/210 |
| 6,098,749 A * | 8/2000 | Enochs | .................... | E04G 5/003 248/238 |
| 6,571,966 B1* | 6/2003 | Hsiao | .................... | A47F 7/0028 206/379 |
| 6,837,383 B1* | 1/2005 | McElhaney, Jr. | ......... | B25H 5/00 211/70.6 |
| 6,902,034 B2* | 6/2005 | Gibson | ................... | E04G 5/003 182/152 |
| 7,077,238 B2* | 7/2006 | Butler | ....................... | E06C 7/14 248/210 |
| D575,972 S * | 9/2008 | Shiao | ............................. | D6/567 |

(Continued)

FOREIGN PATENT DOCUMENTS

| | | | | |
|---|---|---|---|---|
| EP | 1225287 A2 * | 7/2002 | ............... | E04F 21/02 |
| GB | 2325267 A * | 11/1998 | ............... | E04G 5/00 |
| GB | 2438469 A * | 11/2007 | ............... | E04G 5/00 |

*Primary Examiner* — Stanton L Krycinski

(57) ABSTRACT

The "Tool Organizer" works in union with a scaffold. The "Tool Organizer" apparatus of a condensed step design having a plurality of cavities, depressions, chambers, and slots for tools and supplies, on each planner surface, wherein a rim encompasses the center plane and two structural reinforce cylinder sleeve mounts, located on the same center axis protrude perpendicular above the center plane and below the center plane with a fastener on each structural reinforce cylinder sleeve mount, which mount upon scaffold top joint round tubes. Therefore, the craftsman's tools are stowed on the "Tool Organizer" within reach with an accessible solid workspace.

3 Claims, 20 Drawing Sheets

(56) References Cited

U.S. PATENT DOCUMENTS

| | | | | |
|---|---|---|---|---|
| D576,292 S * | 9/2008 | Brown | | D25/68 |
| D602,724 S * | 10/2009 | Liu | | D6/567 |
| 7,798,336 B2 * | 9/2010 | Shiao | | B25H 3/04 |
| | | | | 211/DIG. 1 |
| 8,490,747 B2 * | 7/2013 | Winslow | | E04G 5/003 |
| | | | | 182/119 |
| 8,517,320 B1 * | 8/2013 | Nicely | | A47B 96/063 |
| | | | | 248/220.21 |
| 8,596,454 B1 * | 12/2013 | Carlson | | B25H 3/06 |
| | | | | 248/210 |
| 8,636,153 B1 * | 1/2014 | Dattilo | | A47B 96/027 |
| | | | | 211/85.7 |
| 8,881,917 B1 * | 11/2014 | Sooknanan | | E04G 5/003 |
| | | | | 248/238 |
| 8,925,685 B2 * | 1/2015 | Dufour | | E06C 7/14 |
| | | | | 248/210 |
| 9,359,819 B1 * | 6/2016 | Valadez | | E06C 7/14 |
| 9,714,542 B1 * | 7/2017 | Harcz | | E06C 7/14 |
| D828,739 S * | 9/2018 | Scherer | | D8/71 |
| 10,087,682 B2 * | 10/2018 | Pfeifer | | E06C 7/14 |
| 10,358,832 B1 * | 7/2019 | Wagner | | E04G 5/003 |
| 10,662,706 B2 * | 5/2020 | Heffernan | | E04G 5/003 |
| 10,718,120 B1 * | 7/2020 | Haney | | E04G 5/003 |
| 11,167,407 B2 * | 11/2021 | McGee | | B25H 3/02 |
| 11,359,437 B2 * | 6/2022 | Slate | | B25H 3/021 |
| 2002/0017430 A1 * | 2/2002 | Rosko | | E06C 1/393 |
| | | | | 248/238 |
| 2004/0055979 A1 * | 3/2004 | Fabregas | | B25H 3/06 |
| | | | | 211/70.6 |
| 2004/0144739 A1 * | 7/2004 | Marek | | B25H 3/04 |
| | | | | 211/89.01 |
| 2005/0258002 A1 * | 11/2005 | Sabo | | E06C 7/14 |
| | | | | 182/129 |
| 2006/0169537 A1 * | 8/2006 | Enochs | | E06C 7/14 |
| | | | | 182/129 |
| 2007/0187184 A1 * | 8/2007 | Nasuti | | B66F 11/042 |
| | | | | 182/69.5 |
| 2010/0011679 A1 * | 1/2010 | Monaco | | E04G 3/26 |
| | | | | 52/126.1 |
| 2010/0155177 A1 * | 6/2010 | Tydings, III | | E06C 7/14 |
| | | | | 182/129 |
| 2012/0103726 A1 * | 5/2012 | Morfidis | | E06C 7/14 |
| | | | | 182/129 |
| 2012/0217093 A1 * | 8/2012 | Latimer | | E06C 7/14 |
| | | | | 182/129 |
| 2017/0014989 A1 * | 1/2017 | McGee | | B25H 1/0021 |
| 2017/0089135 A1 * | 3/2017 | Heffernan | | E04G 5/003 |

\* cited by examiner

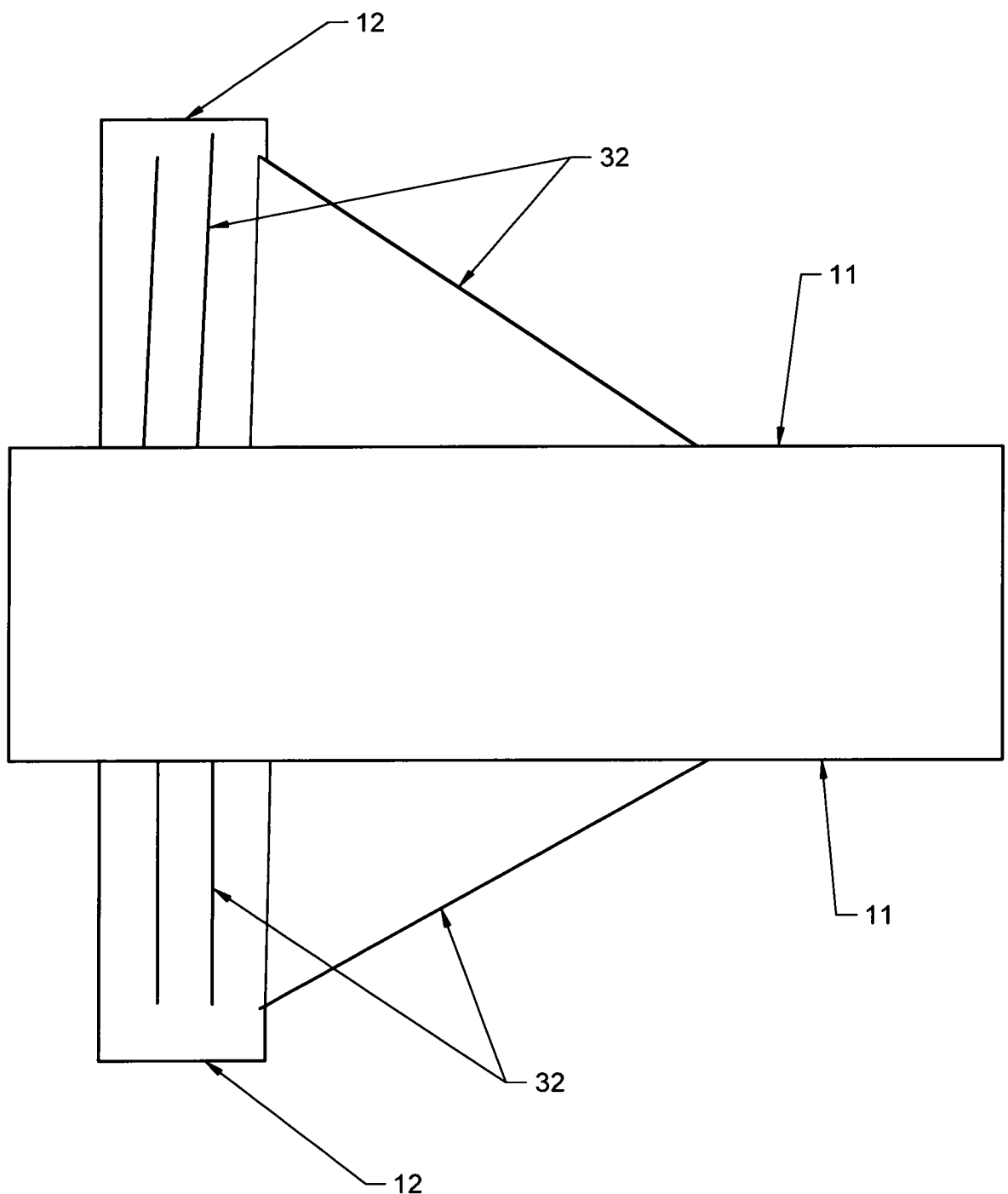

TOOL ORGANIZER

BACKGROUND OF THE INVENTION

Field of the Invention

The present creation contemplates a new and innovative "Tool Organizer" to stow tools and/or selected equipment and supplies safely and secured on a scaffold with a minimal footprint. Although, several patents have been found where a scaffold shelf is used in front of the scaffold, within the confines of the scaffold, or partially on the scaffold. Others have been found to fit it on a ladder.

Description of Related Art

US. Patent Documents

U.S. Pat. No. 4,452,151A 1984 Jun. 5 Jarrard, George
U.S. Pat. No. 4,494,465A 1985 Jan. 22 Fick Jr, Charles M
U.S. Pat. No. 4,862,994A4 1989 Sep. 5 Hughes Sr., Earl
U.S. Pat. No. 5,158,023A 1992 Oct. 27 Allen, Tony L
U.S. Pat. No. 5,622,463A 1997 Apr. 22 Testa, Vincent M.
U.S. Pat. No. 5,730,066A 1998 Mar. 24 Auten, Christopher L.
U.S. Pat. No. 6,098,749A 2000 Aug. 8 Enochs, William R.
U.S. Pat. No. 6,116,163A 2000 Sep. 12 Mitchell, Robert A.
U.S. Pat. No. 6,902,034B2 2005 Jun. 7 Cosco Management, Inc.
U.S. Pat. No. 7,353,911B1 2008 Apr. 8 Freeman, Thomas A
US20130220951A1 2013 Aug. 29 Dufour, Donald
US20050211742A1 2005 Sep. 29 Shawn Mapes & Dennis Machie Inventor Mr. Tony L. Allen, "U.S. Pat. No. 5,158,023A", published 1992 Oct. 27, designed the Scaffold table for sheet rock finishers in which the table hooks to the scaffold cross members.

Inventor Mr. Earl Hughes Sr, "U.S. Pat. No. 4,862,994A", published 1989 Sep. 5, created the Ladder Platform, in which the platform attaches to a ladder.

Inventor Mr. Donald Dufour created the Ladder and Scaffold Apparatus, "US20130220951A1", published 2013 Aug. 29, where the apparatus can fit on a ladder and hangs on the scaffold. He has a hole for one scaffold top joint round tube with an unsecured fit and underneath the apparatus a cross-member leans upon the cross member of the scaffold. This shelf is on one plane.

The "Tool Organizer" has the cylinder sleeve mounts with structural braces on the center bottom plane and center top plane.

Inventor Mr. Robert Mitchell, "U.S. Pat. No. 6,116,163A", published 2000 Sep. 12, created an adjustable work table. The worktable is attached to the cross member of the scaffold and has a table draw.

Cosco Management, Inc., "U.S. Pat. No. 6,902,034B2", published 2005 Jun. 7, titled apparatus with utility tray mounted to scaffold, is an all-in-one scaffold and does not look or function like the "Tool Organizer".

Inventor Mr. Thomas A. Freeman created "U.S. Pat. No. 7,353,911B1", published 2008 Apr. 8, titled Scaffold Shelf, in which the table is basica Ilya flat table. This connects to the crossbars of the scaffold.

Inventor Mr. Vincent M. Testa created "U.S. Pat. No. 5,622,463A", published 1997 Apr. 22, titled Ceiling tile cutting table. The innovation is attached to the cross members of the scaffold.

Inventors Shawn Mapes & Dennis Machie, "US20050211742A1", published 2005 Sep. 29 teach, "Specifically, in use as an article support, base member 4 of article support member 1 is inserted into the cavity defined by wall 202. A post-mounted storage caddy comprises a caddy body adapted to be mounted to a post, and especially a seat post in a boat. A storage tray with compartments is pivotally mounted to the caddy body, whereby the caddy body functions as a lid for the storage caddy. The storage caddy can also include a cup holder and other holding means."

"A force exerted at point P1, due to the same downward pressure, is directed opposite to the force at point P2. Thus, the forces at both P1 and P2, due to the downward pressure on article support portion 7, are directed substantially perpendicular to the downward force. In addition, as with the wedging action of the aforementioned BRIDGES applications and patent, the more that downward pressure is applied to article support portion 7, the greater the wedging force becomes."

"Post-mounted storage caddy, due to its relatively low profile and its aesthetic appeal, base support member 115 or 116 is well suited for use in an automotive vehicle, aircraft, boat, or rail or other vehicle, where its use cannot be hidden from view and there is generally no convenient location for placing a beverage container."

The "Tool Organizer" is used on a scaffold or any other mounting that it will fit.

"Post-mounted Storage Caddy" as stated above, "Specifically, in use as an article support, base member 4 of article support member 1 is inserted into the cavity defined by wall 202." The base member 4 of article support member 1 is inserted into the cavity.

The "Tool Organizer" "Cylinder Sleeve Mounts", mount over the scaffold round tubes. It mounts on the exterior of the scaffold round tubes not the interior.

The "Post-mounted Storage Caddy" teaches, "The member is tilted as by downward pressure under such conditions, a wedging action occurs between two spaced points of contact, P1 and P2, as shown in FIG. 4. As with the wedging action of the aforementioned BRIDGES applications and patent, the more that downward pressure is applied to article support portion 7, the greater the wedging force becomes."

The "Tool Organizer" is stabilized with fasteners.

The "Post-mounted Storage Caddy" and the "Tool Organizer" apparatus are fundamentally different.

Inventor Mr. William R. Enochs, "U.S. Pat. No. 6,098,749A", published 2000 Aug. 8, titled Work Holder, teaches the invention is a plastic basket with closed ended tubes on each end with a n upper cross bar.

"The "Work Holder" Scaffold extendable members or as it is called "Slides" #7. This #7 "Slides" is a scaffold tube which extends from the interior of the base scaffold tube. The spring clamps hold the scaffold tube in place, sothey do not retreat. The work basket 8, into closed end sockets 9 of which scaffold extendable members slides #7 extend. The work basket 8 and the closed end sockets 9 move up and down with the extendable tubes. Clamp means are provided for holding the extendable members in selected positions with respect to the base member, and a work holder is mounted at an upper end of the extendable members. The work holder is a plastic basket with an integral socket into which upper ends of the extendable members are fitted. The basket is made of a high impact plastic, and the sockets are molded integrally with the rest of the basket."

"For one, we are talking about two different style scaffolds. Mr. Enoch's scaffold slides up and down. The other type of scaffold is stationarywhere another scaffold is placed upon the first one and so forth to the height desired."

However, the "Work Holder" and the "Tool Organizer" are essentially different.

If the "Tool Organizer" were mounted upon the "Work Holder's" scaffold, the "Tool Organizer" can move up and down the Scaffold and secured at whatever level the craftsman so desired. The #7 "Slides" or scaffold tube would not move up and down but remain stationary. The "Work Holder" would remain sitting on top of the scaffold. It would move to the height the scaffold tubes were extended.

The "Work Holder" has closed ended sockets.

Whereas, the "Tool Organizer" has open ended cylinder sleeve mounts.

The "Work Holder" closed ended sockets are fully molded into the basket.

The "Tool Organizer" cylinder sleeve mounts are attached on the top center plane and the bottom center plane which may project past the top and does project past the bottom center plane. The "Tool Organizer" cylinder sleeve mounts each have three stabilizing braces attached to the bottom center plane and attached to the cylinder sleeve mount.

The "Work Holder" does not secure it to the #7 "Slides" or scaffold tube. The spring clamps hold the scaffold tube in place, so they do not retreat.

The "Tool Organizer" has a set screw to stabilize it to the scaffold tubes.

The "Work Holder" has a plastic basket.

The "Tool Organizer" is designed with a condensed step design which has several different functional planes which orderly stow several power tools, hand tools, supplies, drink, and phone.

The "Work Holder" is a basket full of tools and supplies stacked together.

The "Tool Organizer" condensed step design is calculated to get the maximum working area out of the coveted space. The subject presented pertains to an apparatus that can stow several tools and/or supplies.

The "Work Holder" and the "Tool Organizer" are simply different.

BRIEF SUMMARY OF THE INVENTION

The present creation contemplates a new and innovative "Tool Organizer" to stow tools and/or and supplies safe and secure on a scaffold. The condensed step design does not invade the scaffold area, whereas order brings productivity and safety. The tools and/or supplies are easily accessible. The "Tool Organizer" comprised of the condensed step design top shelf, top front face, center plane, bottom face plane, and bottom plane. Two-cylinder sleeve mounts protrude perpendicularly above the center plane section and below the center plane bottom with a fastener on each cylinder sleeve mount. Each cylinder sleeve mount is supported with three stabilizing braces below the center plane and above the center plane, and the two-cylinder sleeve mounts, which mount upon a scaffold top joint round tubes. The alternate two-cylinder sleeve mounts with a square base, which mount upon the scaffold top joint round tubes and over the scaffold square frame. The cylinder sleeve mounts, the stabilizing braces, and the fasteners, hold the "Tool Organizer" in place.

The condensed step design comprises a plurality of holes situated in various positions on every plane with a plurality of different shapes, sizes, radius, circular holes, elongated slots, and a rectangle indentation, and rectangle cavities.

The top shelf comprises a plurality of circular holes in a variety of locations which may be rectangular elongated slots, plurality of apertures, a cup cavity, and a phone slot. The top front face comprises of a plurality recessed chambers. The center plane is comprised of a rim which encompasses the center plane, a plurality of cavities, a plurality of rectangle slots, a plurality of rectangular indentations of variety of depths, a plurality of rectangle cavities, a plurality of various size slots and circular indentations. The bottom face plane comprises of rectangular tool slot. The bottom plane comprises of a plurality of hooks. The "Tool Organizer" can be crafted by a person having ordinary skill in the crafts with the ability to be forged, 3d printed, or a plurality of other fabrication procedures. The "Tool Organizer" can be made of carbon fiber, plastic, aluminum, or a plurality of various other materials.

BRIEF DESCRIPTION OF THE DRAWINGS

It is to be noted that the drawings presented are intended solely for the purpose of illustration and are therefore, neither desired nor intended to limit the scope of the disclosure to any or all of the exact details of construction shown, except insofar as they may be regarded as necessary to the claimed invention. The invention, however, is not intended to be limited to the specific terminology so selected.

The present description will be understood with attention to and with reference to, the following drawings viewed in conjunction with the detailed description of the Invention referring thereto, in which like reference numbers throughout the drawings designate like structure, and in which:

FIG. 20 is a sectional right view drawing of the center shelf revealing the top stabilizing braces and the bottom stabilizing braces. The top stabilizing braces are attached to the cylinder sleeve mount and to the top of the center shelf. The bottom stabilizing braces are attached to the cylinder sleeve mount and to the bottom of the center shelf.

DETAILED DESCRIPTION OF THE INVENTION

Figure 1:
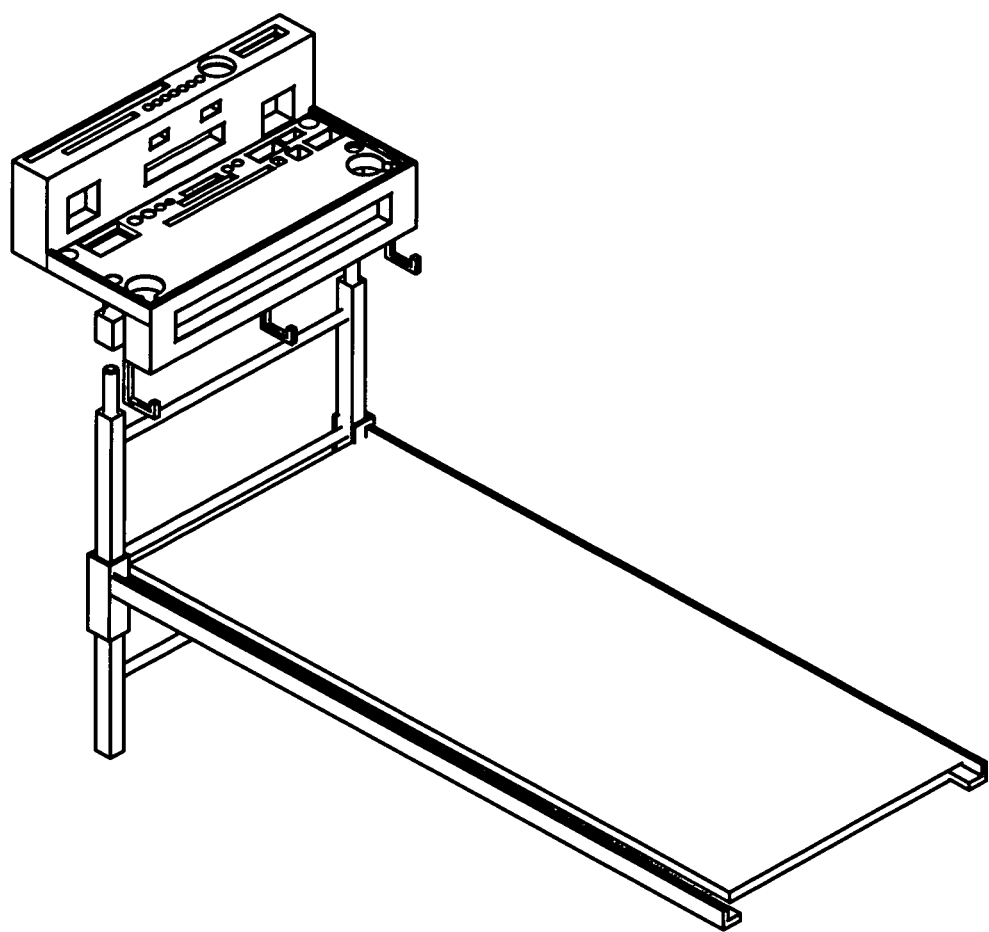
FIG. 1 is the perspective drawing of the "Tool Organizer" suspended over a scaffold.
Figure 2:
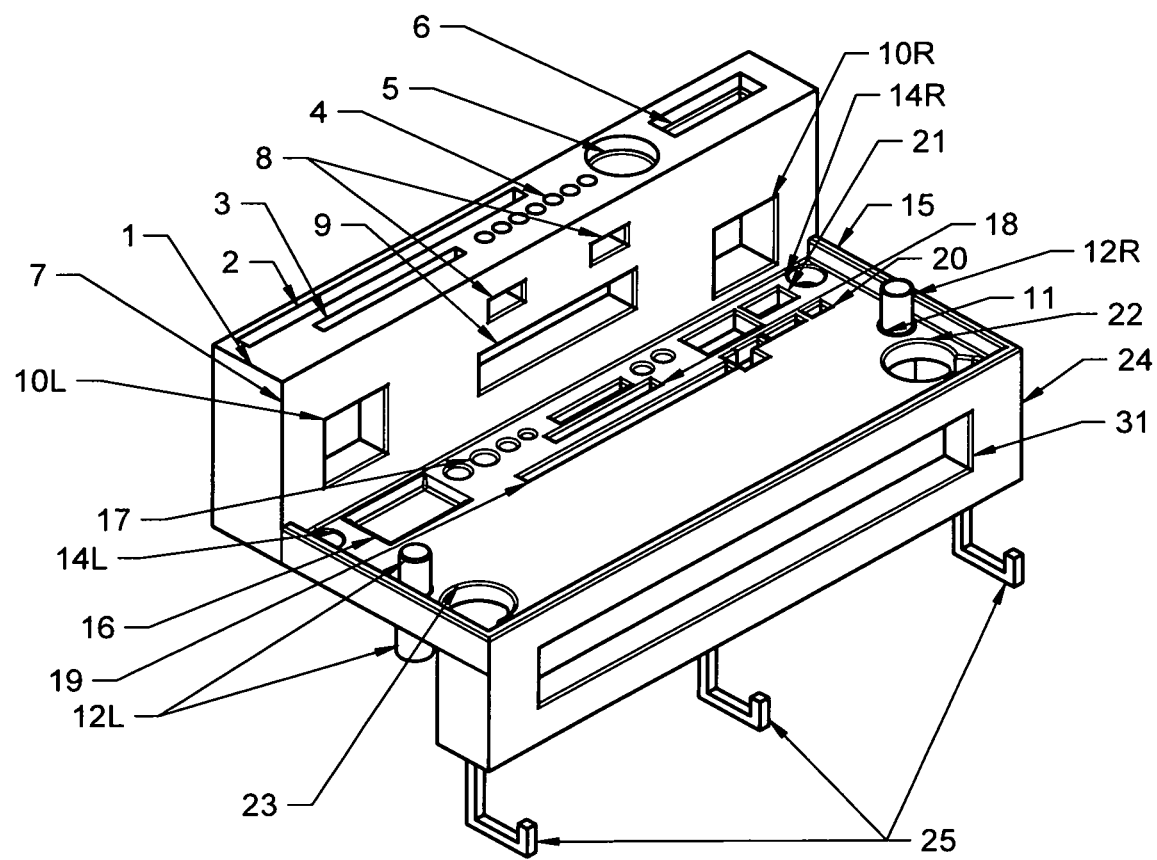
FIG. 2 is the perspective drawing of the "Tool Organizer".
Figure 3:
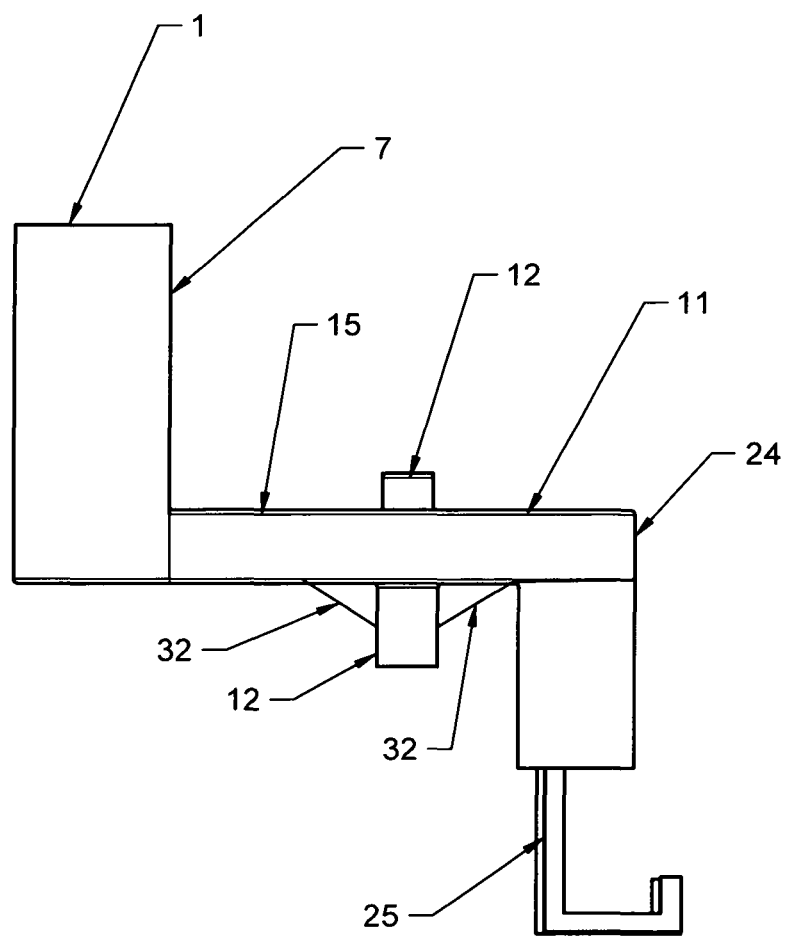
FIG. 3 is the left side view drawing of the "Tool Organizer". This drawing reveals the importance of the step configuration of the noninvasive condense design.
Figure 4:
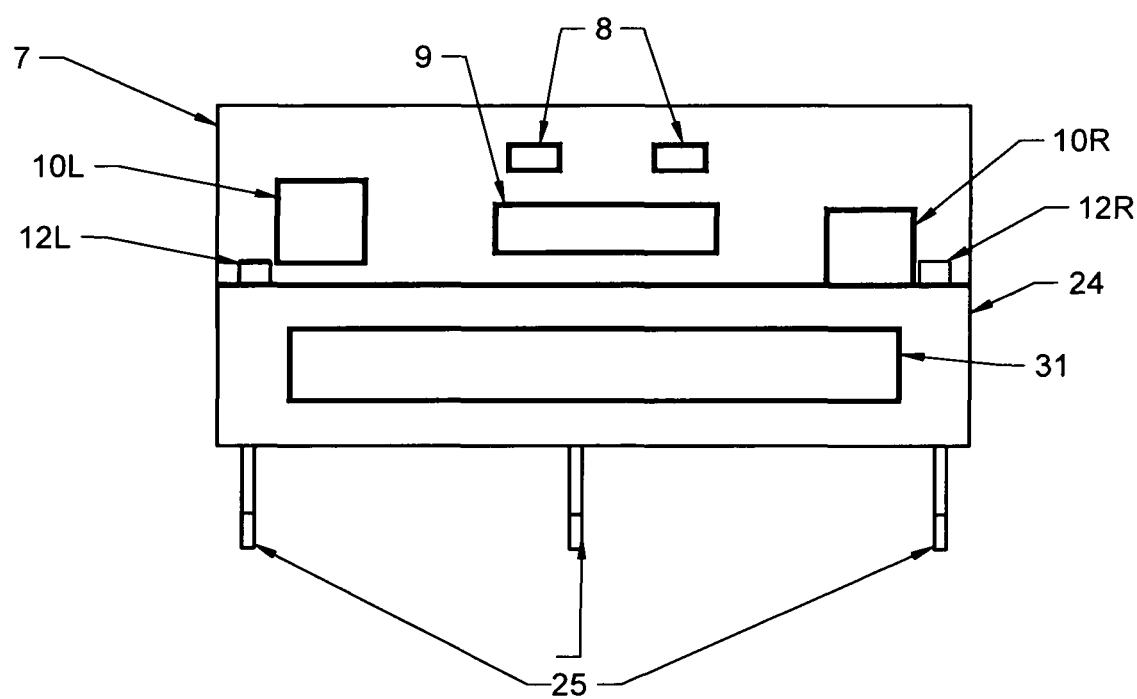
FIG. 4 is the front view drawing of the "Tool Organizer".
Figure 5:
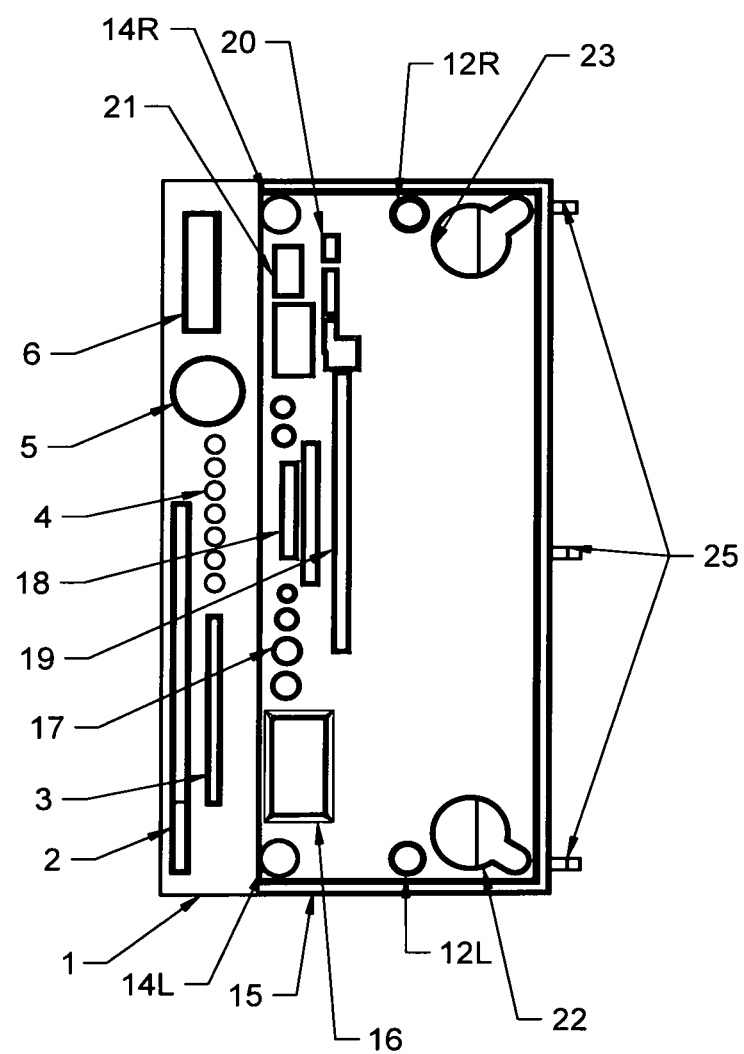
FIG. 5 is the top view drawing of the "Tool Organizer".
Figure 6:
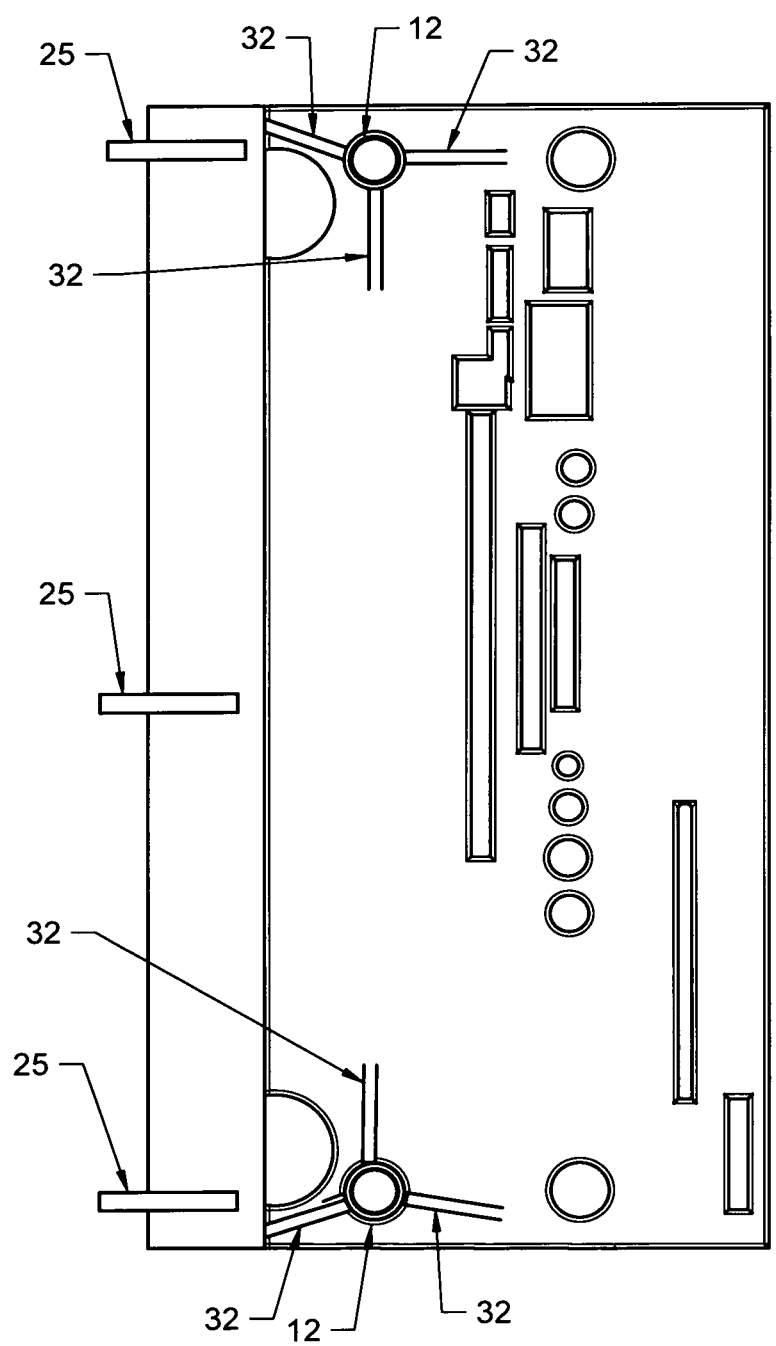
FIG. 6 is the bottom view drawing of the "Tool Organizer". It reveals the stabilizing braces attached to the cylinder sleeve mounts and to the bottom of the center shelf.
Figure 7:
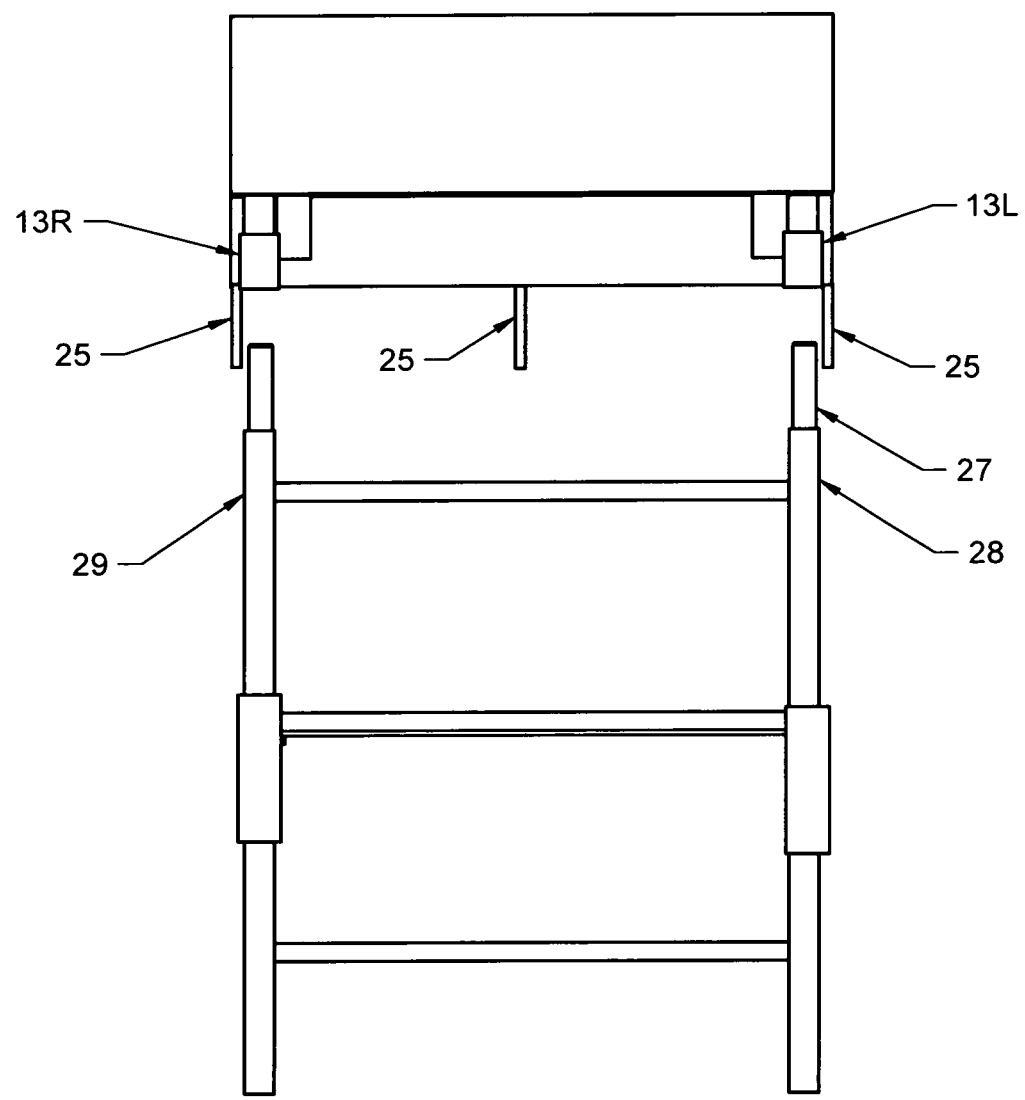
FIG. 7 is the rear-view drawing of the "Tool Organizer" suspended over the scaffold. The drawing reveals the cylinder sleeve mounts with the square bases to mount the "Tool Organizer" in place on the scaffold.
Figure 8:
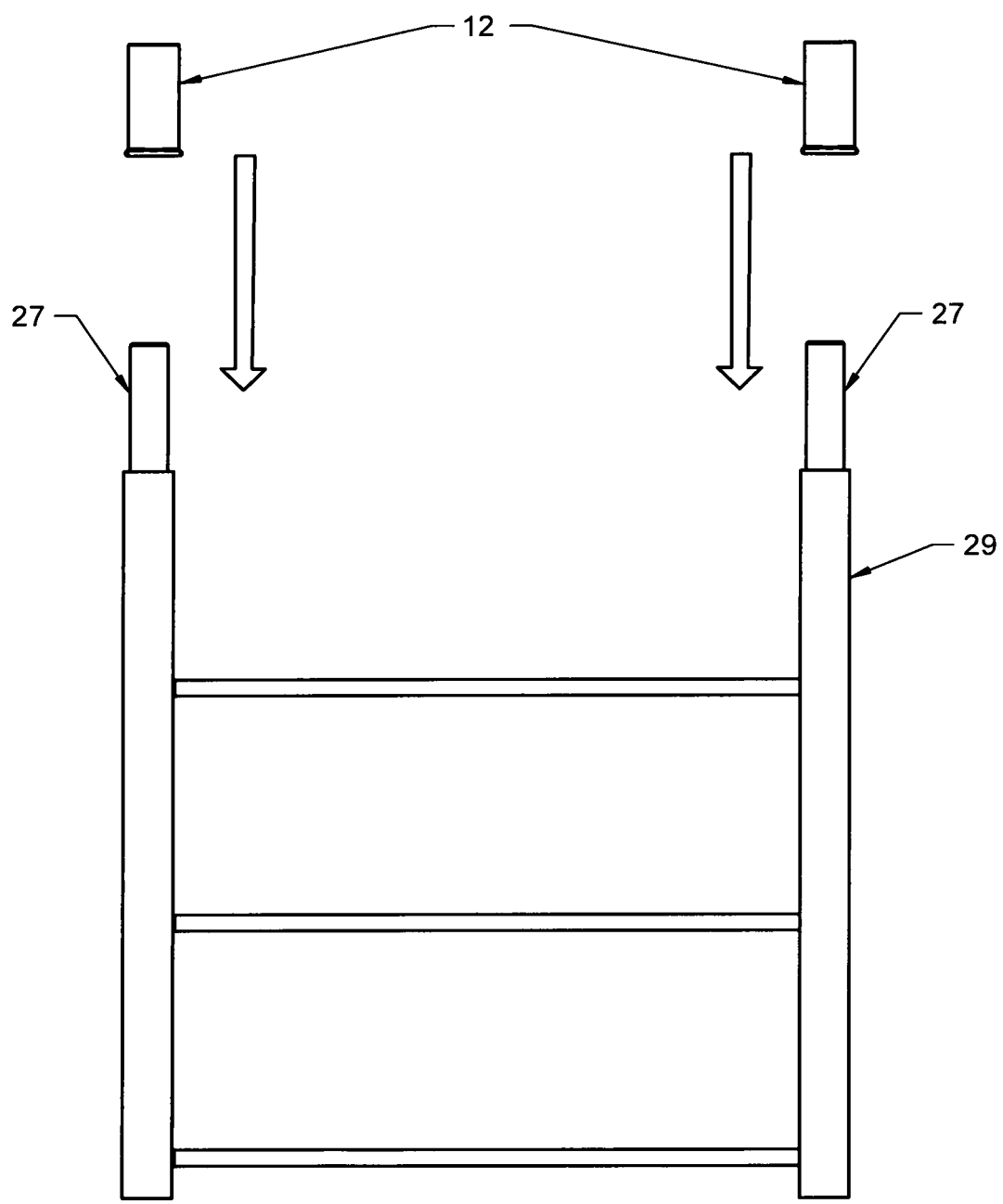
FIG. 8 is the drawing of the cylinder sleeve mounts suspended over the scaffold, which hold the "Tool Organizer" in place. The arrows depict the direction for the cylinder sleeve mounts to mount the scaffold.
Figure 9:
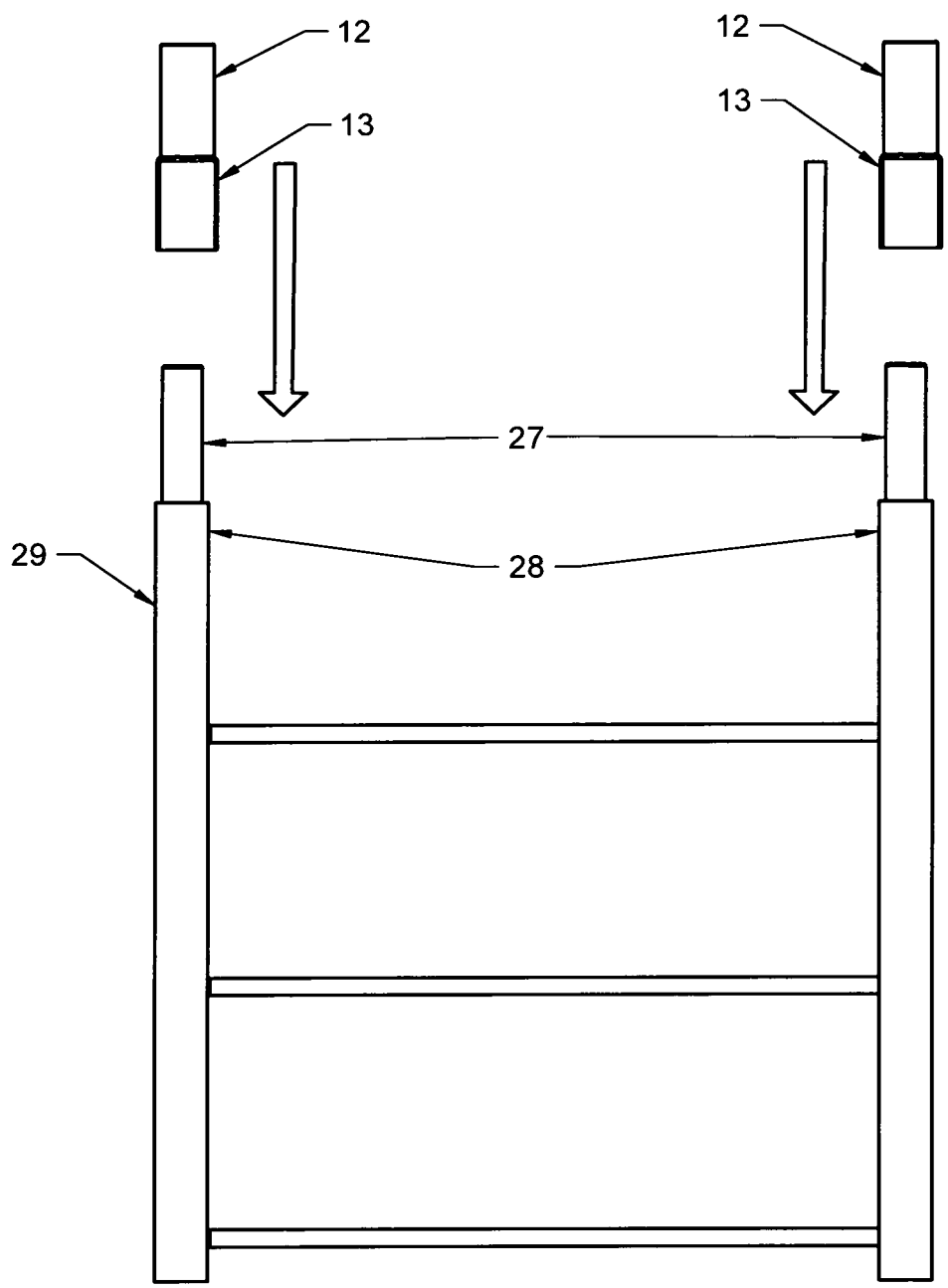
FIG. 9 is the drawing of the cylinder sleeve mount with square bases suspended over the scaffold, which hold the "Tool Organizer" in place. The arrows depict the direction for the cylinder sleeve mounts with square base to mount the scaffold.
Figure 10:
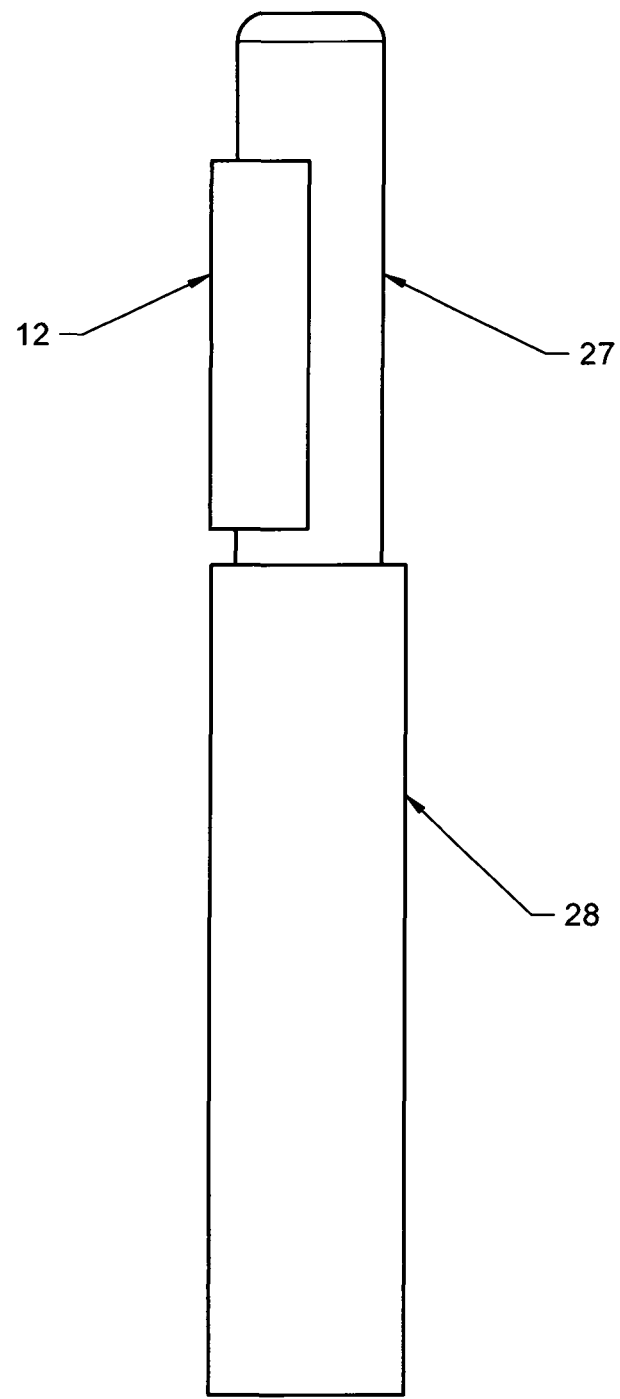
FIG. 10 is a sectional drawing of the cylinder sleeve mount upon the scaffold top joint round tube.
Figure 11:
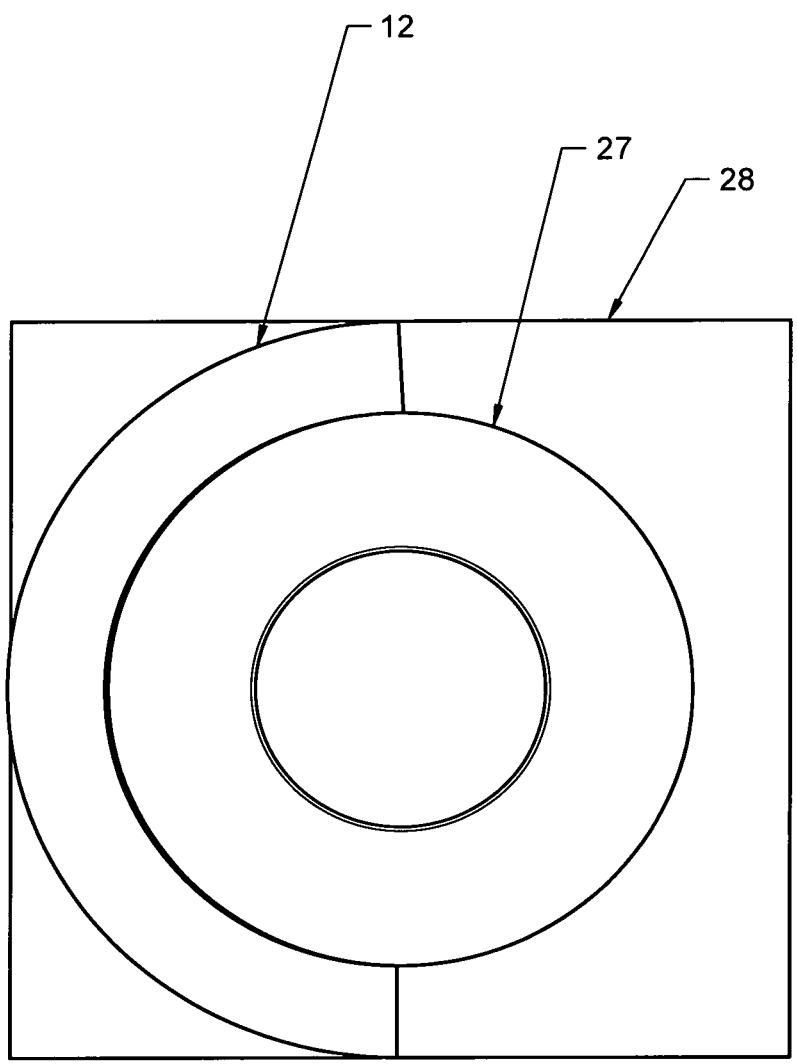
FIG. 11 is a sectional drawing of a top of the cylinder sleeve mount upon the scaffold top joint round tube.
Figure 12:
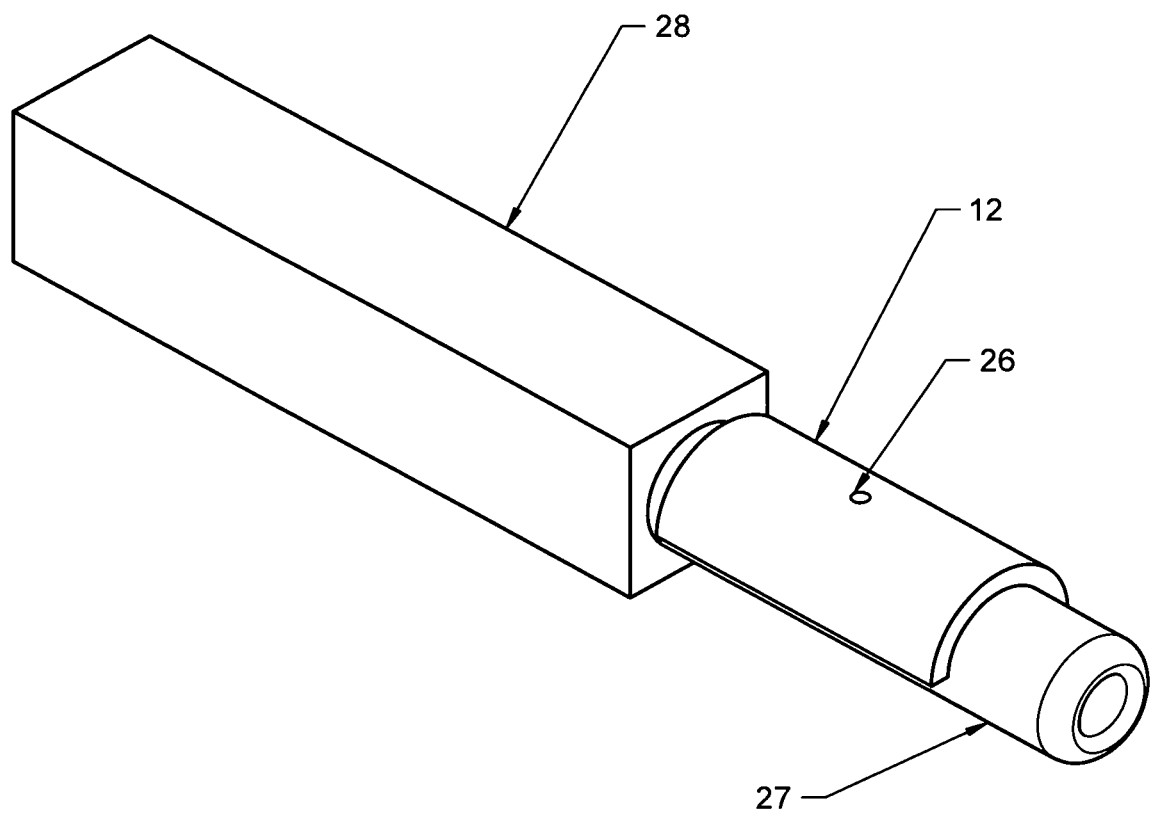
FIG. 12 is a sectional drawing of the cylinder sleeve mount with the set screw upon the scaffold top joint round tube.
Figure 13:
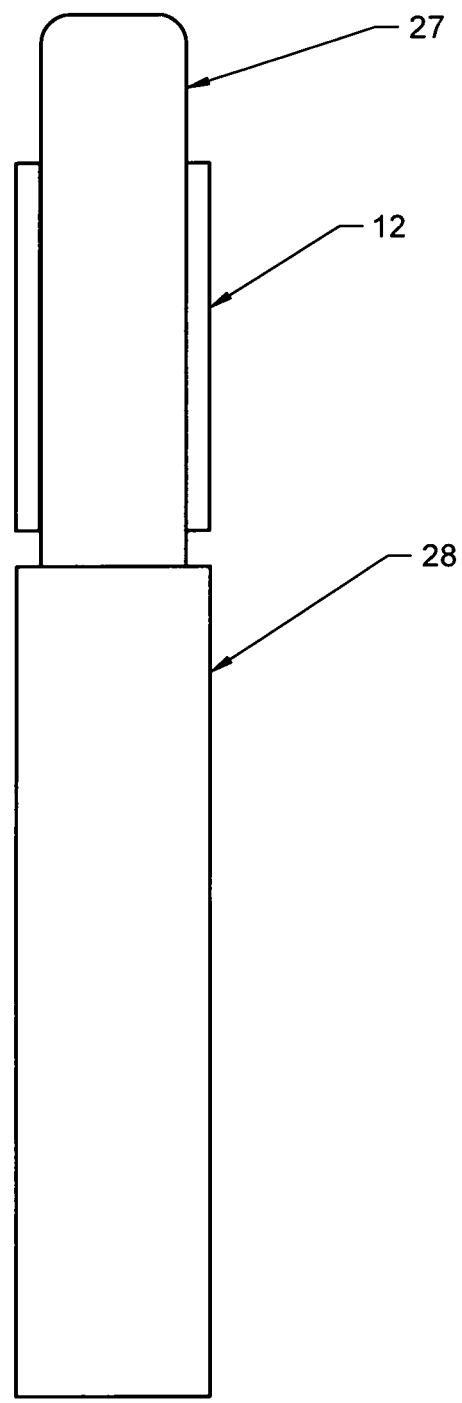
FIG. 13 is a sectional drawing of the cylinder sleeve mount upon the scaffold top joint round tube.
Figure 14:
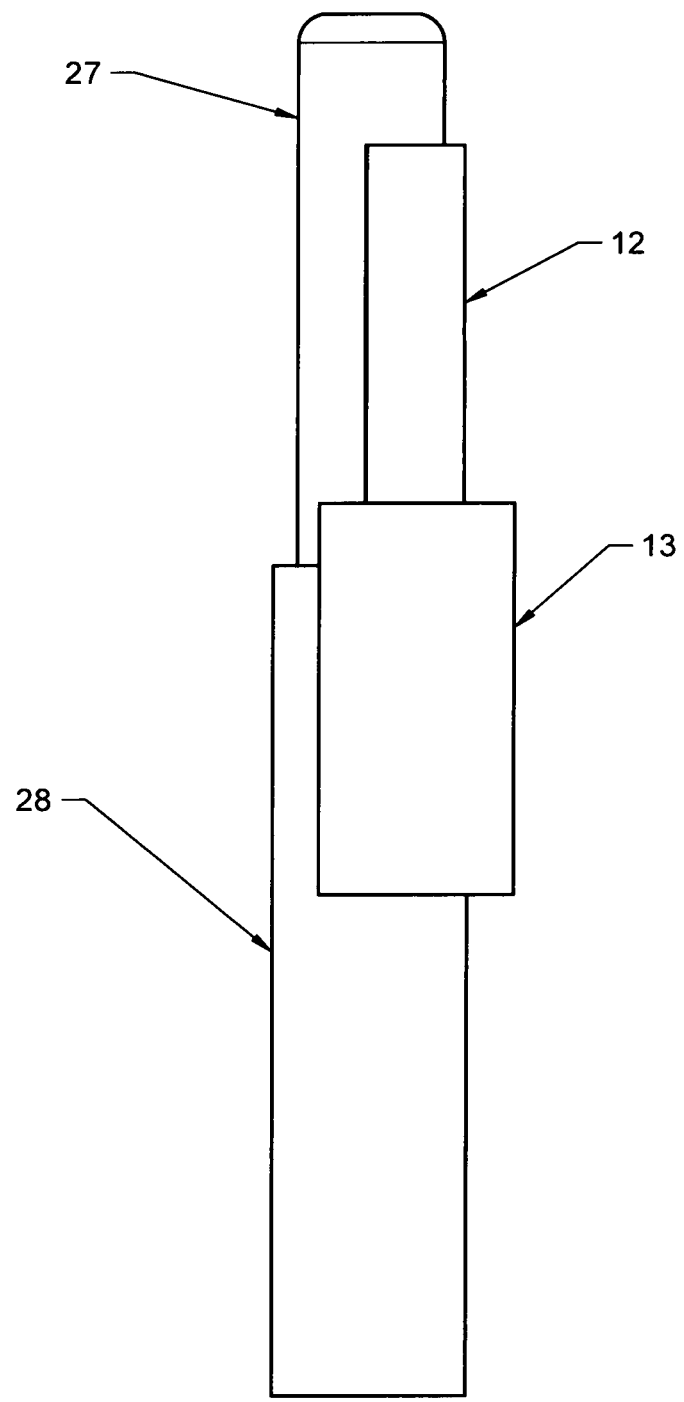
FIG. 14 is a sectional drawing of the cylinder sleeve mount with the square base upon the scaffold top joint round tube and the scaffold square tube base.
Figure 15:
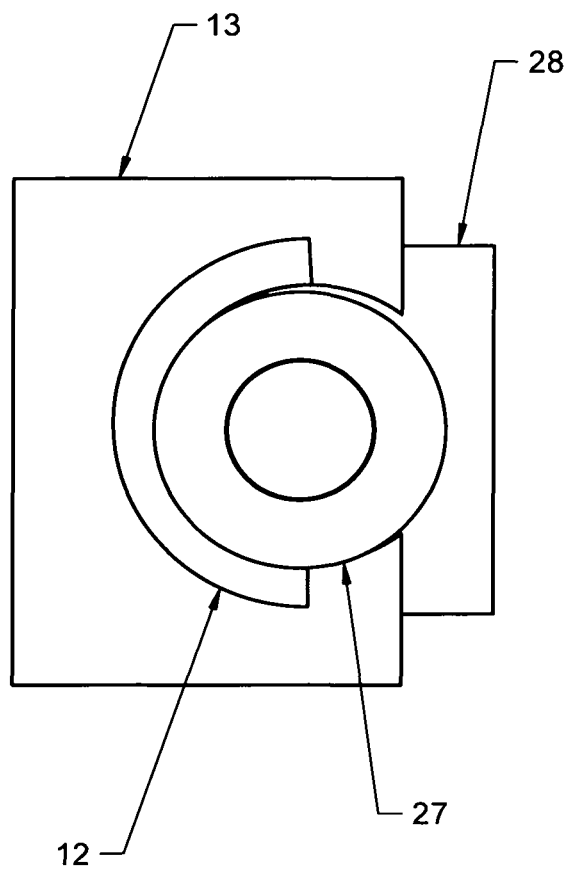
FIG. 15 is a sectional drawing of a top sectional view of the cylinder sleeve mount with square base upon the scaffold top joint round tube and the scaffold square tube base.
Figure 16:
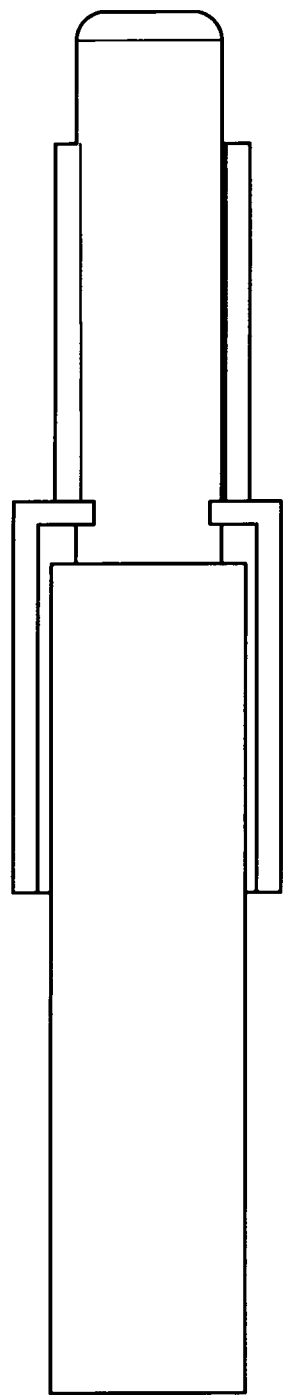
FIG. 16 is a sectional drawing of the front view of the cylinder sleeve mount with the square base upon the scaffold top joint round tube and the scaffold square tube base.
Figure 17:
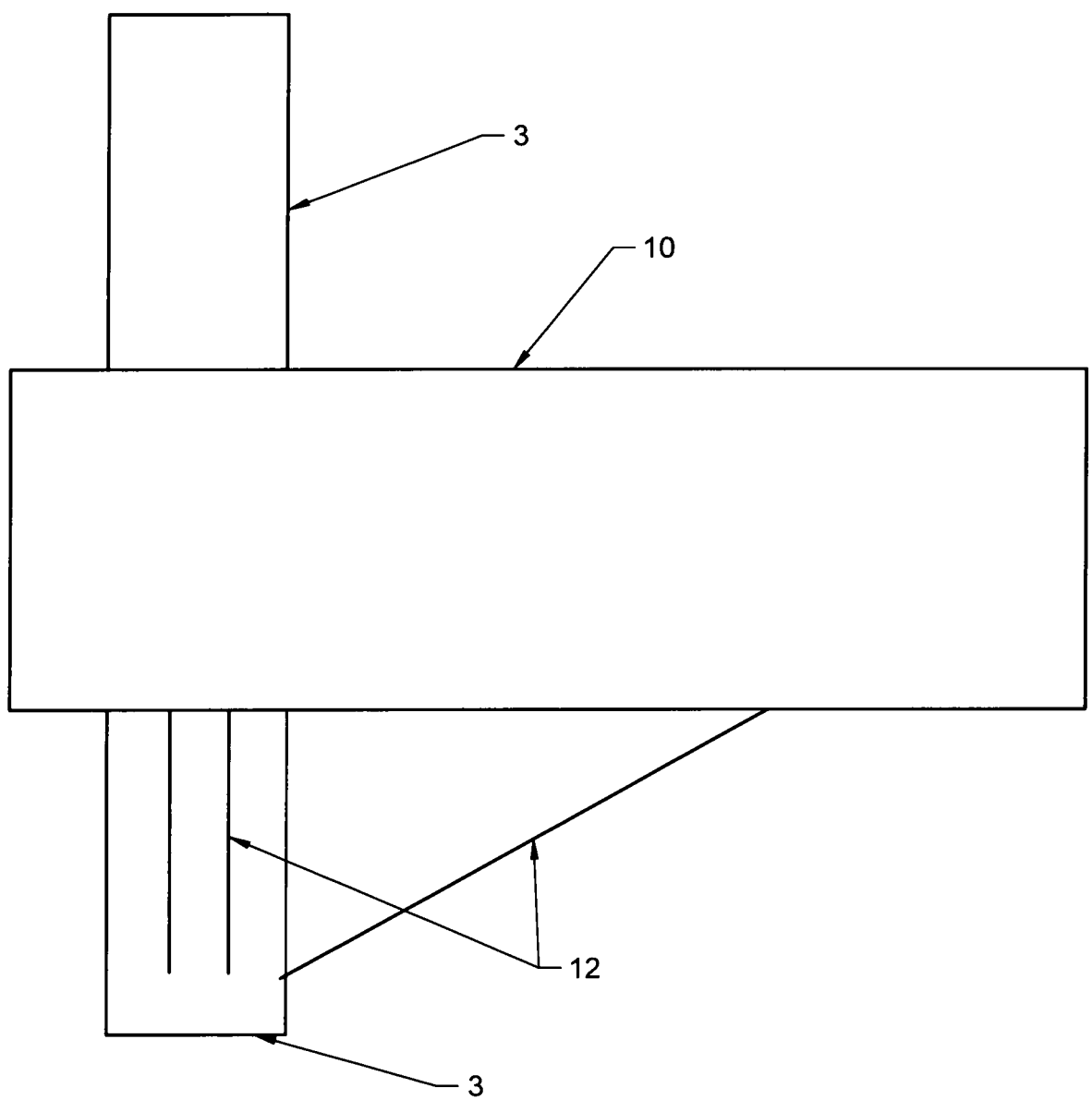
FIG. 17 is a sectional right view drawing of the center shelf revealing the bottom stabilizing braces. The stabilizing braces are attached to the cylinder sleeve mount and to the bottom of the center shelf.
Figure 18:
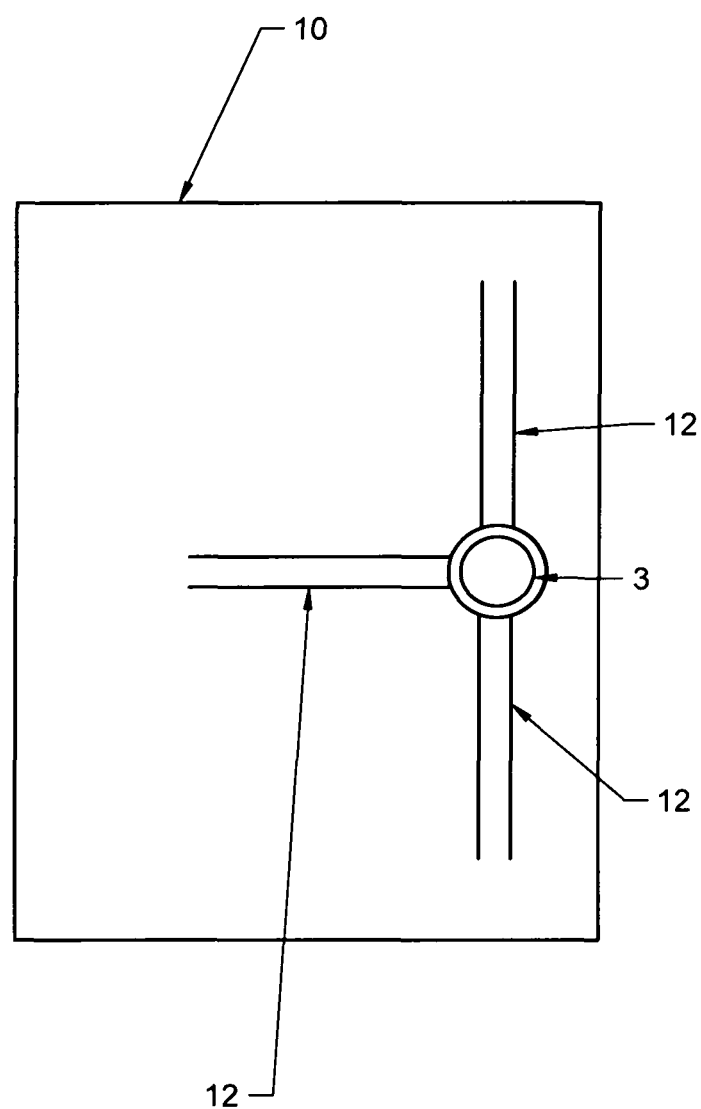
FIG. 18 is a sectional drawing of the bottom view of the center shelf. The stabilizing braces are attached to the cylinder sleeve mount and to the bottom of the center shelf.
Figure 19:
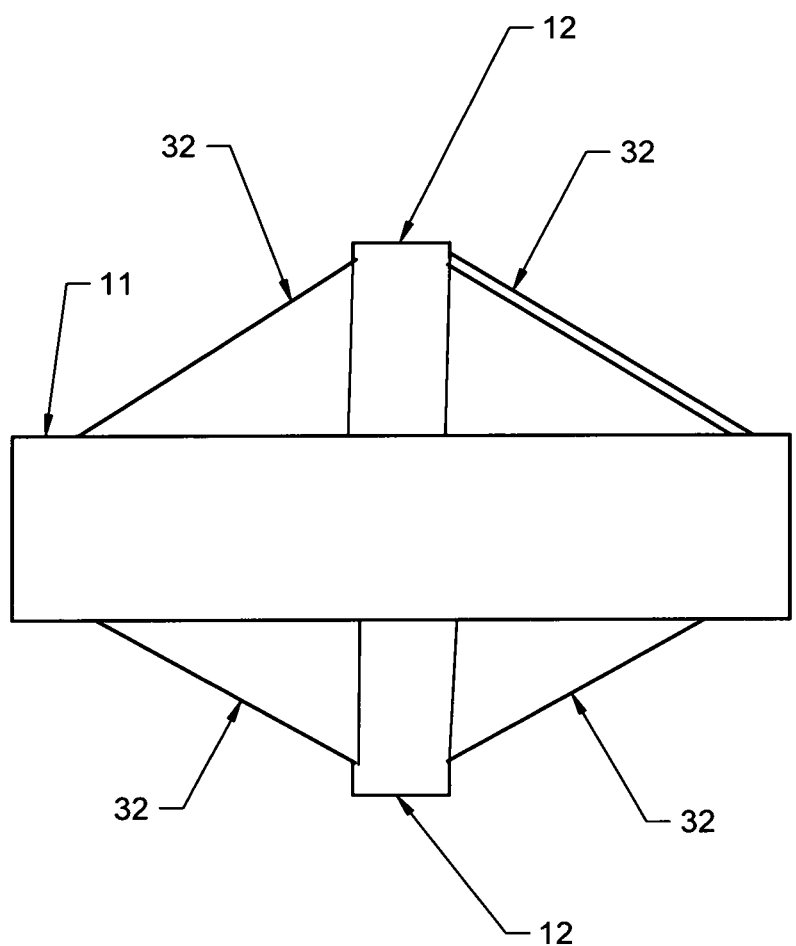
FIG. 19 is a sectional front view drawing of the center shelf revealing the top stabilizing braces and the bottom stabilizing braces. The top stabilizing braces are attached to the cylinder sleeve mount and to the top of the center shelf. The bottom stabilizing braces are attached to the cylinder sleeve mount and to the bottom of the center shelf.

The present discloser relates generally to the construction field with consideration of the order of hand tools, work area, and make the job orderly for more production upon a scaffold. Many craftsmen working on a scaffold have many tools dangerously laying all over the scaffold. They stumble over the tools and waste valuable time looking for the tool they desperately need. Order brings productivity and the "Tool Organizer" design is the tool that brings order.

The beauty of the "Tool Organizer" is the condensed step design which does not invade the scaffold area. It aids in the function of the scaffold and makes the job at hand more productive because the tools or supplies are easily assessable with no more bending or stooping looking for or stumbling over tools or supplies.

The ability of the cylinder sleeve mounts to hold the "Tool Organizer" in place is what make it work. Along with the stabilizing braces the cylinder sleeve mounts bare the weight of the "Tool Organizer".

The "Tool Organizer" can be crafted by a person having ordinary skill in the crafts and will have the ability to be forged, 3d printed, or crafted from a plurality of other procedures. The "Tool Organizer" can be made of carbon fiber, plastic, aluminum, or a plurality of various other materials.

The step configuration of the "Tool Organizer" is designed to get the maximum working area out of the coveted space. The "Tool Organizer" consist of the top shelf 1, the top shelf front face 7, the center shelf 11 and the lower front face 24 of the center shelf 11. The "Tool Organizer" is mounted on top of a scaffold upper joint round tube 27 which emerges from the scaffold square tube base 28. The scaffold's top joint round tube is where another scaffold section is mounted upon the scaffold's top joint round tubes 12. The cylinder sleeve mounts 12 are located on each side of the center shelf 11 which slip over the two scaffold's top joint round tubes 27. The cylinder sleeve mounts 12 hold it in place. Also, the cylinder sleeve mounts with square base 13 design hold the shelf in place mounted on the scaffold's top joint round tubes 27 and the scaffold square tube base 28. The set screws 26 turned tight steadies the "Tool Organizer".

The top shelf 1 holds several tools, such as, the framing square) and speed square slotted positions 3 are located to the rear left position of the top shelf. The bit apertures 4, screw bit, drill bit or a plurality of other tools slots are in the center of the top shelf 1. The cup holder 5 is located between the bit apertures 4 and the smart phone slot 6. In the upper center of the top shelf front face 7 the roller paint pan slots 8 are located. The torpedo level recessed space 7 is located below the roller paint pan slots 8. To the right of the torpedo level recessed space 9 is the tape measure recessed space location 10R. Another tape measure recessed space 10L is located to the left of the torpedo level recessed space 7.

The center shelf 11 and the "Tool Organizer" is held in place with the right cylinder sleeve mounts 12R and the left cylinder sleeve mounts 12L on the center right and on the center left of the center shelf 11. Each has a set screw 26 to stabilize the "Tool Organizer" upon the scaffold top joint round tubes 27 or the scaffold square tube base 28. Each of the cylinder sleeve mounts extend below and may extend above the center shelf 11. Each of the cylinder sleeve mounts 12 below the center shelf 11 is supported with three stabilizing braces 32. Each stabilizing brace 32 is attached to the bottom of the center shelf 11 and to the side of each cylinder sleeve mounts.

An alternative to the cylinder sleeve mounts 12 is the cylinder sleeve mounts with square base 13 in conjunction with cylinder sleeve mounts 12. The set screws 26 are located in the center of the cylinder sleeve mounts 12.

The center shelf 11 has a perimeter shelf rim 15 to prevent a tool, fastener, etc., from falling. The tool aperture 22 front right, and the tool aperture 23 front left, located close to the front are able to hold a plurality of different tools. Smaller tool apertures 14R and 14L are right rea r and left rear, respectively, of the center shelf 11 to hold a plurality of different tools, such as a hammer, an adjustable wrench, a pipe wrench, and a plurality of other tools. The chisel apertures 20, or a plurality of other tools, are located to the rear right of the center shelf 11. The drywall knife slots 18 are located to the rear center. The third drywall knife slot 18 from the back of the center shelf 11 can also be used as a circular saw blade slot 19, a jig saw blade slot, or a plurality of other tools slot, so the tool can sit flat on the center shelf 11. The paint brush apertures 17 which hold tools such as a paint brush, or a plurality of other types of tools, are located to the left of the drywall knives slots 18. The large rectangle tray 16 is located to the rear left: this may hold small screws, nails, or various other fasteners. If the craftsman needs space to assemble parts or work on a project, the "Tool Organizer" has ample space for him to do so. Also, the center shelf 11 can hold a gallon paint can, a drywall trayfull of mud, or whatever the craftsman, such as a painter, drywaller, carpenter, electrician, plumber, HVC, or any other may need it for.

The center shelf lower front face 24 has the level pocket 31. Below the level pocket 31 are the tool hooks 25 to hold a reciprocating saw, a jig saw, or various other tools, or materials.

What is claimed is:

1. A tool organizer comprising:

a stepped design comprising a top shelf with a top front face, a center shelf with a top center plane and a bottom center plane extending horizontally from a bottom portion of the top front face, and a bottom front face extending vertically below the center shelf from a front portion of the center shelf;

two sleeve mounts protruding from the center shelf, each sleeve mount having a top portion perpendicularly extending from a top surface of the top center plane, and a bottom portion perpendicularly extending from a bottom surface of the bottom center plane, each sleeve mount comprising a fastener to mount upon a scaffold;

each sleeve mount comprising one of: (a) a cylinder mounted upon a round tube of a top joint of the scaffold, or (b) a cylinder with a square base mounted upon a square frame of the scaffold;

each sleeve mount comprising at least one stabilizing brace attached to the bottom surface of the bottom center plane and to a side surface of the respective sleeve mount, and at least one stabilizing brace attached to the top surface of the top center plane and to a side surface of the respective sleeve mount;

the top shelf comprising a plurality of elongated slots, a plurality of circular indentations, a circular cavity, and a rectangular slot;

the top front face comprising a plurality of recessed chambers;

the center shelf comprising a plurality of cavities, a plurality of rectangular slots, a plurality of rectangular indentations having different depths, a plurality of rectangular cavities, a plurality of different sized slots, and a plurality of different sized circular indentations;

the center shelf comprising a rim encompassing the center shelf, the rim configured to prevent tools or fasteners from falling off the center shelf;

the bottom front face comprising a rectangular tool slot, and a plurality of hooks extending from a bottom portion of the bottom front face, the hooks configured to hold tools; and wherein the top shelf, the top front face, the center shelf, and the bottom front face are configured to hold tools.

2. The tool organizer of claim 1, wherein the fastener is a set screw.

3. The tool organizer of claim 1, wherein the tool organizer is made from a material selected from the group consisting of: carbon fiber, plastic, and aluminum.

* * * * *